United States Patent [19]

Abolins et al.

[11] Patent Number: 4,681,906

[45] Date of Patent: * Jul. 21, 1987

[54] POLYPHENYLENE COMPOSITIONS CONTAINING SULFONATE HAVING IMPROVED MELT BEHAVIOR

[75] Inventors: Visvaldis Abolins; Thomas A. Morelli, both of Delmar, N.Y.

[73] Assignee: General Electric Company, Selkirk, N.Y.

[*] Notice: The portion of the term of this patent subsequent to Jul. 16, 2002 has been disclaimed.

[21] Appl. No.: 794,203

[22] Filed: Nov. 1, 1985

[51] Int. Cl.$^4$ ............................................. C08L 71/04
[52] U.S. Cl. ................................... 524/166; 524/157; 524/158; 524/161; 524/508; 524/540; 524/577; 524/611; 528/212; 528/214; 528/217; 528/218

[58] Field of Search ............... 524/166, 157, 158, 161, 524/508, 540, 577, 611; 528/212, 214, 217, 218

[56] References Cited

U.S. PATENT DOCUMENTS 4,529,761 7/1985 Lohmeijer ............................. 524/89
4,551,494 11/1985 Lohmeijer ............................ 524/157

*Primary Examiner*—Harold D. Anderson
*Attorney, Agent, or Firm*—Michael J. Doyle

[57] ABSTRACT

Polyphenylene ether resin compositions exhibiting improved melt behavior without degradation of other thermal properties are provided by combining a polyphenylene ether polymer and an alkyl or aralkyl sulfonate of an alkali metal, where the alkyl or aralkyl radical has 5 to 25 carbon atoms.

8 Claims, No Drawings

POLYPHENYLENE COMPOSITIONS CONTAINING SULFONATE HAVING IMPROVED MELT BEHAVIOR

FIELD OF THE INVENTION

The melt behavior of polyphenylene ether compositions can be improved or controlled without reducing the inherent thermal properties of such compositions. The improvement is achieved by a combination of polyphenylene ether resin and an alkyl or aralkyl sulfonate compound.

BACKGROUND OF THE INVENTION

Polyphenylene ether resin compositions have long been utilized as thermoplastics because they exhibit a variety of beneficial physical and chemical properties which are useful in many applications. Excellent electrical properties, high DTUL as well as inherent flame retardance are three of the prime advantages of polyphenylene ether resins. Despite these advantages, polyphenylene ether resins are not necessarily suitable as molding compositions for many applications without further modification. One of the primary reasons for this is the relatively high melt viscosity of polyphenylene ether resins. A result of this property is relatively poor flow channel exhibited in a typical molding process. Poor flow results in difficulties in molding, losses in manufacturing efficiency as well as poor material performance. For example, in a typical molding process, polyphenylene ethers might have a flow channel of less than twelve inches even at very high temperatures. A glass transition temperature of 210° C. for polyphenylene ethers also indicates that these polymers have characteristically superior thermal properties which may require an element of control in order to provide certain useful products.

A very successful family of thermoplastic products are the modified-polyphenylene ether products wherein the polyphenylene ether base resin is modified or plasticized with another compound in order to provide useful plastic compositions. Typically, modified polyphenylene ethers are comprised of PPE and an alkenyl aromatic compound such as high impact polystyrene. These materials are alloyable in all proportions and provide a variety of products exhibiting advantages of both classes of compounds while minimizing the disadvantages of each. Other plasticization methods are also useful for polyphenylene ether compounds and many conventional plasticizers have been tried. One successful category of such plasticizers has been the triaryl phosphates which are low molecular weight materials which not only tend to plasticize the polyphenylene ethers but also impart an additional degree of flame retardance for these compounds.

Such plasticized modified polyphenylene ether compositions have provided useful products which, however, do not necessarily exhibit the extraordinary thermal properties of unmodified polyphenylene ether. Additionally, some placticized modified-polyphenylene ether compositions tend to experience environmental stress cracking under certain conditions when exposed to stress cracking agents.

In U.S. Pat. No. 4,529,761, which issued July 16, 1985 and is hereby incorporated by reference, Lohmeijer described polyphenylene ether resin compositions which exhibited improved environmental stress crack resistance and which were comprised of polyphenylene ether resins or such resins modified with alkenyl aromatic resins and effective amounts an environmental stress crack resistance agent which was an alkyl or aralkyl sulfonate compound. Lohmeijer did not recognize, however, that such environmental stress crack resistance agents could be utilized in unmodified polyphenylene ether resin compositions (i.e. those which do not contain alkenyl aromatic compounds) and which would thereby provide extraordinarily beneficial thermal properties not otherwise available in modified-PPE systems.

It has now been discovered that the melt behavior of polyphenylene ether resin compositions can be controlled or improved without significantly reducing the inherent thermal properties of such materials and without having to incorporate conventional plasticizers in the compositions. Although conventional plasticizers can improve the melt behavior of polyphenylene ether resins as, for instance, by making them easier to flow in a molding process, they traditionally degrade the other thermal properties of the base resin due to their plasticizing effect. For example, when plasticizers are added to polyphenylene ethers, the flow channel of the resin may increase but the heat distortion temperature of the plastic will generally decrease.

The present invention improves the melt behavior of the polyphenylene ether without conventional plasticizers, therefore, while the flow channel in a molding process will be improved, the heat distortion temperature and thermal stability will not be degraded. The polyphenylene ether resin compositions of the present invention will thereby exhibit good low temperature and high temperature ductility, as well as, excellent hydrolytic stability and the aforementioned excellent electrical properties.

Unmodified polyphenylene ether resin compositions were former non-processable or difficult to process materials. The compositions of the present invention, which exhibit improved flow and melt characteristics while not tending plasticizing the base resin can form the basis of new resin systems which take advantage of these properties.

It is therefore an object of the present invention to provide polyphenylene ether resin compositions which exhibit improved or at least controlled melt characteristics while not generally degrading the inherent advantageous thermal properties of the base resin.

It is a further object of the present invention to provide a process for advantageously controlling the melt behavior of the otherwise difficult to process polyphenylene ether resin compositions.

SUMMARY OF THE INVENTION

There is provided a thermoplastic resin composition exhibiting controlled melt behavior without degradation of the inherent thermal properties of the base resin, which consists essentially of:

(a) a polyphenylene ether resin or copolymers thereof, and which typically will be poly(2,6-dimethyl-1,4 phenylene ether), and (b) a property improving amount of a compound of the formula R-SO$_3$X wherein R represents and alkyl or aralkyl radical having 5 to 25 carbon atoms and X represents an alkali metal ion. Typically radical R will have approximately 12 to 20 carbon atoms and is preferably an alkyl radical, X is preferably a sodium ion. The polyphenylene ether base resin will generally have an intrinsic viscosity less than, approximately, 0.42 and preferably between 0.38 to 0.42 deciliters per gram as measured in chloroform at 25° C. Conventional polyphenylene ether resins have intrinsic typically in excess of 0.45 deciliters per gram and often in excess of 0.50 deciliters per gram and this is felt to substantially contribute to the poor melt behavior of such conventional, unmodified polyphenylene ether resins. On the other hand, there is a practical limit as to how low the intrinsic viscosity of such polyphenylene ether resins can be and those acquainted with polymer physics will recognize that intrinsic viscosities for PPE much lower than the 0.38 deciliters per gram required by compositions of the present invention will yield polymer products having poor physical properties. When the intrinsic viscosity of the PPE utilized in compositions of the present invention rises much above the 0.42 deciliters per gram mentioned above, the compositions begin to behave more like relatively unprocessable conventional polyphenylene ether resin compositions despite the addition of the melt behavior improving agents utilized by the present invention.

Polyphenylene ethers are a well known class of compounds sometimes referred to as polyphenylene oxides. Examples of suitable polyphenylene ethers and processes for there preparation can be found in U.S. Pat. Nos. 3,306,874; 3,306,875; 3,257,357; and 3,257,358. Compositions of the present invention will encompass homopolymers, copolymers and graft copolymers obtained by the oxidative coupling of phenolic compounds. The preferred polyphenylene ethers used as base resins in compositions of the present invention will be comprised of units derived from 2,6-dimethyl phenol. Also contemplated are PPE copolymers comprised of units derived from 2,6-dimethyl phenol and 2,3,6-trimethyl phenol.

The polymer compositions of the present invention will consist essentially of 0.5 to 10 parts by weight of the melt behavior improving compound based upon 100 parts of the polyphenylene ether base resin. Preferably about 1 to 5 parts by weight of the additive will be used per 100 parts of the PPE base resin. When less than about 0.5 parts additive are utilized, insufficient beneficial effect will be achieved for typical applications. When greater than approximately 5 to 10 parts of additives are utilized, littel additional benefit is achieved while other advantageous properties of PPE may be diminished. This additive compound is an alkyl or aralkyl sulfonate having a formula R-SO$_3$X in which R represents an alkyl or aralkyl radical with 5–25 carbon atoms and preferably and 12 to 20 carbon atoms and X represents an alkali metal ion which is preferably a sodium ion. It is also possible to utilize a mixture of such sulfonates.

Suitable sulfonates include the following products which may be obtained commercially. $C_{12-20}H_{25-40}SO_3Na$ are compounds sold under the tradename HOSTASTAT. Compounds sold under the tradename ATMER 190 have the general formula $C_xH_{2x+1}SO_3Na$. Others are sold under the tradename MARANIL A and have the general formula $C_{12}H_{25}$-$C_6H_4$-$SO_3Na$. It will be recognized by those skilled in the art that these formulas represent sulfonate salts of hydrocarbon compounds having varying chain lengths.

The improved compositions of the present invention are provided by combining the polyphenylene ether based resin and the property improving melt behavior additive by conventional means as will be demonstrated in the examples below. Blended or extruded compositions may be molded and tested by conventional means.

The following examples illustrate the invention without limitation. All of the foregoing U.S. Patents are hereby incorporated by reference.

EXAMPLES 1–3

Compositions of the present invention exhibiting improved melt behavior were provided in the following manner. The four experimental blends described in Table 1 were compounded using a 28 mm Werner & Pfleiderer twin screw extruder having this temperature profile through several stages (set temperatures): 500° F. (Feed Section), 550° F., 590° F., 590° F., 590° F., 600° F. (die Temperature). During compounding, a vacuum of 5 inches was maintained for all four samples, while the screw RPM's were a constant 272. Table 1 also describes the extrusion conditions which were observed to change among the materials due to the compositional differences and which demonstrate some of the advantages of the present invention. The polyphenylene ether resin, having the intrinsic viscosity indicated in Table 1, was the oxidative coupling product of 2,6-dimethyl phenol.

TABLE 1

| Composition (parts by weight) | A* | 1 | 2 | 3 |
|---|---|---|---|---|
| poly(2,6-dimethyl-1,4-phenylene ether)$^{(a)}$ | 100 | 100 | 100 | 100 |
| $C_{12-20}H_{25-41}SO_3Na^{(b)}$ | — | 1 | 2 | 3 |
| Extrusion Conditions | A | 1 | 2 | 3 |
| Torque (in-lbs) | 780 | 640 | 600 | 500 |
| Power/current (amp) | 15 | 13 | 12.5 | 10 |
| Melt Temp. (°F.) | 705 | 698 | 690 | 680 |
| Extrusion Rate (g/hr) | 2400 | 3400 | 4000 | 4000 |
| Observations | Very Smooth Strand Uniform Extrusion | Very Smooth Strand Uniform Extrusion | Smooth Strand Uniform Extrusion | Rough Strand Gassy, Surging Extrudate |

*Comparative Example
$^{(a)}$polyphenylene ether having as intrinsic viscosity of 0.40 dl/g as measured in chloroform at 25° C.
$^{(b)}$HOSTASTAT HS-1 sodium salt of lauryl sulfonate (A. G. Hoechst Co.)

Table 1 demonstrates that the sodium salt additive clearly improved the compounding process for a polyphenylene ether polymer. The reduction of extruder torque and power requirements (amperes) are noteworthy improvements in the processability of polyphenylene ether. Furthermore, the lowering of the melt temperatures while extrusion rates were increased are two additional benefits achieved in compositions of the present invention. Lower melt temperatures save energy and are less abusive to the polymer. Increased extrusion rates are a productivity improvement indicative of the efficiencies gained by the present invention.

Pellets of each of the aforementioned compositions were molded into ASTM test specimens using a 4 ounce Newbury injection molding machine. Prior to molding the pellets were dried for four hours at 115° C. The following molding conditions were present and remained constant during the molding process of all four samples:

| Barrel Temperature (°F.) | 630° |
|---|---|
| Mold Temperature (°F.) | 220° |
| Cycle Time, Total (Sec) | 40 |
| Back Pressure (Psi) | 50 |
| Injection Speed | Slow |

As observed during the compounding process, certain conditions changed during the molding process for each of the four sample materials. Table 2 describes these changes in molding conditions which are attributable to the inherent advantages of the present invention.

TABLE 2

| Molding Conditions | Composition | | | |
|---|---|---|---|---|
| | A* | 1 | 2 | 3 |
| Melt Temperature °F. | 655 | 640 | 630 | 630 |
| Pressure Required to Fill Mold Cavities (PSI) | 1150 | 950 | 925 | 900 |
| Channel Flow @ 10,000 psi (in) | 12 | 13 | 13 | 14.5 |
| Observations | Difficulties Filling All Cavities | Good Moldability | Good Moldability | Poor Surface Splay Lamination |

Comparative Example

It is apparent that the sulfonate salt additive lowers the melt temperature of the polyphenylene ether required to mold parts. Furthermore there is a concurrent lowering of the pressure required to fill the cavities of the ASTM test specimen mold. The channel flow increased even though the molding temperature decreased.

It is evident from the foregoing that the sulfonate salt additive for polyphenylene ether improves not only the extrusion and compounding process for such materials but also is beneficial for the polyphenylene ether molding process.

The foregoing experimental materials were tested to compare important physical properties of the resultant thermoplastic products. The melt viscosities of the materials were tested using an Instron melt rheometer at 600° F. and 1500 sec$^{-1}$ shear rate. Table 3 describes the other physical properties which were tested by ASTM test methods and other accepted test practices.

TABLE 3

| COMPOSITION NO. | A* | 1 | 2 | 3 |
|---|---|---|---|---|
| Tensile Str. (psi) | 12,700 | 10,700 | 10,500 | 10,100 |
| Elongation (percent) | 27 | 31 | 30 | 13 |
| Flexural Str. (psi) | 15,200 | 15,200 | 15,200 | 14,700 |
| Flexural Mod. (psi) | 344,000 | 356,000 | 349,000 | 343,000 |
| Impact Resistance | | | | |
| Notch. Izod @ 73° F. (ft-lb/in.n) | 1.4 | 1.7 | 1.9 | 2.0 |
| Notch. Izod @ −40° F. (ft-lb/in.n) | 1.2 | 1.7 | 1.9 | 1.8 |
| Dynatup Imp. Str. @ 73° F. (in-lbs) | 63 | 156 | 205 | 61 |
| Dynatup Imp. Str. ° −40° F. (in-lbs) | 32 | 55 | 64 | 39 |
| Melt Viscosity @ 600° F. and 1500 sec$^{-1}$ (poise) | 3168 | 2761 | 2440 | 2105 |
| DTUL @ 264°psi (°F.) | 368° F. | 368° F. | 367° F. | |

*Comparative Example

The sulfonate salt modified polyphenylene ether especially at the 2 or 3 weight percent level has greatly improved physical properties except for lower tensile strength values. The most beneficial increases are those of impact resistance and melt flow. The latter benefit is achieved with a very slight sacrifices in deflection temperature under load.

We claim:

1. A thermoplastic composition having improved melt behavior consisting essentially of:
   (a) a polyphenylene ether resin having an intrinsic viscosity less than approximately, 0.42 dl/g as measured in chloroform at 25° C.; and
   (b) a compound of the formula R—SO$_3$X wherein R represents an alkyl or aralkyl radical having 5 to 25 carbon atoms and X represents an alkali metal ion, in an amount effective for improving the melt behavior of said polyphenylene ether resin.

2. A composition as in claim 1 wherein said compound of formula R—SO$_3$X is present in an amount of, approximately, 0.5 to 5.0 parts per 100 parts of the polyphenylene ether resin.

3. A composition as in claim 1 wherein said compound of formula R—SO$_3$X is a mixture of compounds having said formula and R represents alkyl radicals independently having 12 to 20 carbon atoms.

4. A composition as in claim 1 wherein in the formula R—SO$_3$X, X represents a sodium ion.

5. A composition as in claim 1 wherein said polyphenylene ether is a homopolymer or a copolymer.

6. A composition as in claim 5 wherein said polyphenylene ether is poly(2,6-dimethyl-1,4-phenylene)ether.

7. A compsition as ni claim 1 wherein said polyphenylene ether has an intrinsic viscosity of approximately, 0.38 to 0.42 dl/g.

8. A molded article comprised of the thermoplastic composition of claim 1.

* * * * *